(12) United States Patent  
Allen

(10) Patent No.: US 7,603,516 B2  
(45) Date of Patent: Oct. 13, 2009

(54) DISK CONTROLLER PROVIDING FOR THE AUTO-TRANSFER OF HOST-REQUESTED-DATA FROM A CACHE MEMORY WITHIN A DISK MEMORY SYSTEM

(75) Inventor: Ali Allen, Longmont, CO (US)

(73) Assignee: STMicroelectronics NV (NL)

( * ) Notice: Subject to any disclaimer, the term of this patent is extended or adjusted under 35 U.S.C. 154(b) by 982 days.

(21) Appl. No.: 10/016,972

(22) Filed: Dec. 14, 2001

(65) Prior Publication Data

US 2002/0075739 A1 Jun. 20, 2002

Related U.S. Application Data

(60) Provisional application No. 60/255,858, filed on Dec. 15, 2000.

(51) Int. Cl.
G06F 13/00 (2006.01)
G11C 29/00 (2006.01)

(52) U.S. Cl. .................... 711/113; 365/200
(58) Field of Classification Search ............. 711/113; 365/200

See application file for complete search history.

(56) References Cited

U.S. PATENT DOCUMENTS 5,313,612 A * 5/1994 Satoh et al. ............. 711/162
5,696,931 A * 12/1997 Lum et al. ............... 711/113
5,937,427 A * 8/1999 Shinagawa et al. ........ 711/113
6,092,149 A * 7/2000 Hicken et al. ............ 711/113
6,094,728 A * 7/2000 Ichikawa et al. ............ 714/6
6,141,728 A * 10/2000 Simionescu et al. ....... 711/113
6,301,605 B1 * 10/2001 Napolitano et al. ....... 709/201
6,418,510 B1 * 7/2002 Lamberts .............. 711/113
2001/0014929 A1 * 8/2001 Taroda et al. ............... 711/4

* cited by examiner

Primary Examiner—Hyung S Sough
Assistant Examiner—Mardochee Chery
(74) Attorney, Agent, or Firm—Lisa K. Jorgenson; Steven H. Slater

(57) ABSTRACT

A disk-controller (110) that is within a disk memory system (100) initiates the auto-transfer of host-requested-data from cache memory (120) without the intervention of a microprocessor (130) that is within the disk memory system. The system performs auto-transfer, without the intervention of the microprocessor, even when the first block of host-requested-data (301) is not within cache memory (311). The system includes disk-controller circuitry (11) that determines when at least a portion of the host-requested-data is somewhere within cache memory. When only a portion of the host-requested-data is found within cache memory, and the first block of host-requested-data is not the first block of data within cache memory, the circuitry (112) generates a new Cache-Counter-Value, a new Cache-Pointer-Value and a new Cache-Start-Address value, which new values are used to initiate the auto-transfer of this cache-resident-portion of the host-requested-data from cache memory, as the power of the microprocessor is concurrently used to fetch the missing host-requested-data from a magnetic disk device (140).

13 Claims, 5 Drawing Sheets

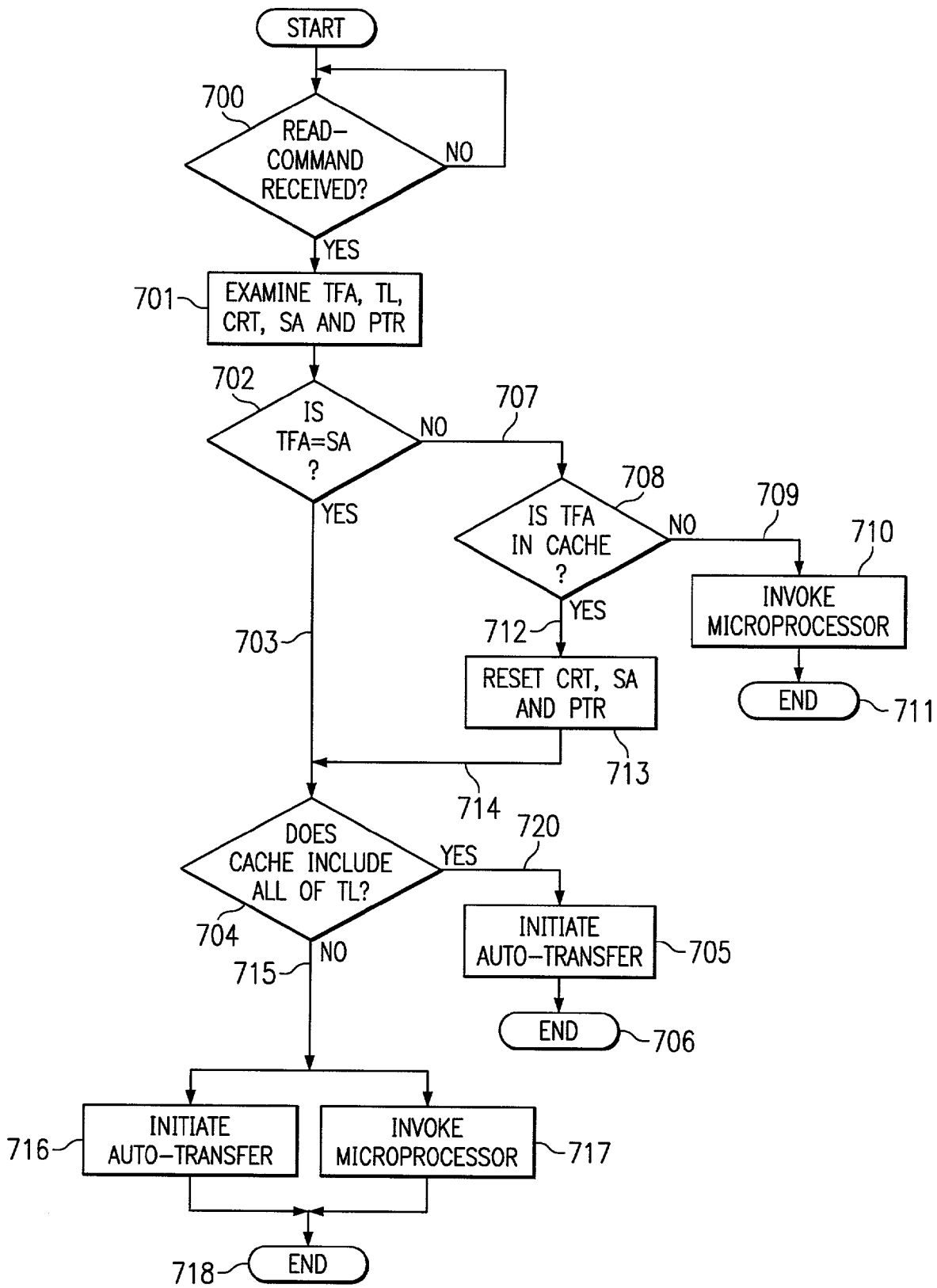

DISK CONTROLLER PROVIDING FOR THE AUTO-TRANSFER OF HOST-REQUESTED-DATA FROM A CACHE MEMORY WITHIN A DISK MEMORY SYSTEM

This application claims the benefit of and claims priority to U.S. provisional patent application 60/255,858, entitled "Disk Controller Providing for the Auto-Transfer of Host-Requested-Data from a Cache Memory Within a Disk Memory System" and filed on Dec. 15, 2000, which application is hereby incorporated by reference.

FIELD OF THE INVENTION

This invention relates to the field of data processing, to the field of disk memory systems, and in particular to a disk-controller that performs the auto-transfer of host-requested-data from a cache memory that is within the disk memory system, the auto-transfer occurring without the intervention of a microprocessor that is within the disk memory system.

BACKGROUND OF THE INVENTION

To improve performance, many disk memory systems include a cache memory integrated within the disk system. Cache improves performance by placing recently used data in a low-latency memory structure. A disk memory system stores data in one or more storage devices. When a host system requests data, it is first determined if the host-requested-data is in a cache memory. Data supplied from cache is supplied more quickly than from the slower magnetic disks. If the host-requested-data is not in cache memory, the host-requested-data is retrieved from the storage device.

The term "auto-transfer" refers to a process of detecting that the host-requested-data is in cache memory, whereupon the host-requested-data is transferred from cache memory to the host system.

In operation, a microprocessor that is within the disk drive system must initiate and control mechanical components that position a magnetic transducer as data is read from magnetic media such as a magnetic disk. The data is then transferred from the storage device to the cache memory and/or to the host system.

One auto-transfer technique uses a hard disk controller to detect that the host-requested-data is in cache memory, and then initiates the auto-transfer of the host-requested-data, but only if the first block of the host-requested-data is also the first data-block in cache memory. In this technique, when the first data block of the host-requested-data is elsewhere in cache memory, then the hard disk controller invokes the microprocessor to initiate a data transfer. In this technique, the microprocessor may execute software that looks elsewhere in the cache memory. However, invoking the microprocessor to look elsewhere in the cache memory, and then initiating the data transfer, wastes valuable processing time of the microprocessor, and thus increases the time that is required for the data transfer.

There is a need in the art for a disk drive system, apparatus and method that operates to initiate the auto-transfer of all cache memory data-blocks that correspond to the whole of or to a portion of the host-requested-data, without the intervention of the disk drive memory system's microprocessor. This auto-transfer should occur irrespective of where in cache memory the corresponding whole or portion of the host-requested-data resides.

SUMMARY OF THE INVENTION

In one aspect, the present invention provides a disk-controller that is constructed and arranged to initiate the auto-transfer of host-requested-data from the cache memory irrespective of where in the cache memory either the whole of, or a portion of, the host-requested-data resides. Circuitry within the disk-controller produces an output that equals the number of data-blocks that exist between the first data-block in cache memory and the first data-block in the host-requested-data. The circuitry uses this number-output to alter or reset address, pointer and counter values so that the host-requested-data effectively becomes the first data-block in the cache memory. The disk-controller then initiates auto-transfer based upon these altered cache memory address, pointer and counter values.

When all of the host-requested-data is in the disk memory system's cache memory, the disk-controller performs the auto-transfer from cache memory without the intervention of the disk memory system's microprocessor.

When only a portion of the host-requested-data resides in cache memory, the microprocessor is enabled to obtain the missing host-requested-data from the storage device, as the cache-portion of the host-requested-data is concurrently auto-transferred to the host system from the cache memory by operation of the disk-controller.

When none of the host-requested-data resides in cache memory, the microprocessor is enabled to obtain all of the host-requested-data from the storage device.

The above-described auto-transfers are beneficial because they occur without the intervention of the microprocessor that is within the disk drive system. The microprocessor is then free to perform other operations, and significantly, the microprocessor is then free to transfer other data into the cache from the storage device. In accordance with a preferred embodiment of this invention, auto-transfer occurs from the cache while the microprocessor performs a slower data transfer of the remaining host-requested-data from the storage device. As a result, the time that is required to accomplish an overall transfer of the host-requested-data is reduced because the cache has hidden the latency associated with the magnetic disk access.

The disk memory system of the invention performs the auto-transfer of host-requested-data from cache memory even when the first data-block of the host-requested-data is not the first block of data in the cache memory.

Advantageously, the disk memory system of the invention performs the auto-transfer without microprocessor intervention, thus leaving the microprocessor free to perform other functions, such as the retrieval of other data from the storage device. As a result, data is rapidly transferred to the host system, and performance of the microprocessor is improved.

These objects and advantages of the invention will be further illustrated with reference to certain preferred embodiments described in detail below.

BRIEF DESCRIPTION OF THE DRAWINGS

FIG. 10 is a process or method flow chart that shows the operation of the preferred embodiments of the present invention.

DETAILED DESCRIPTION

Figure 1:
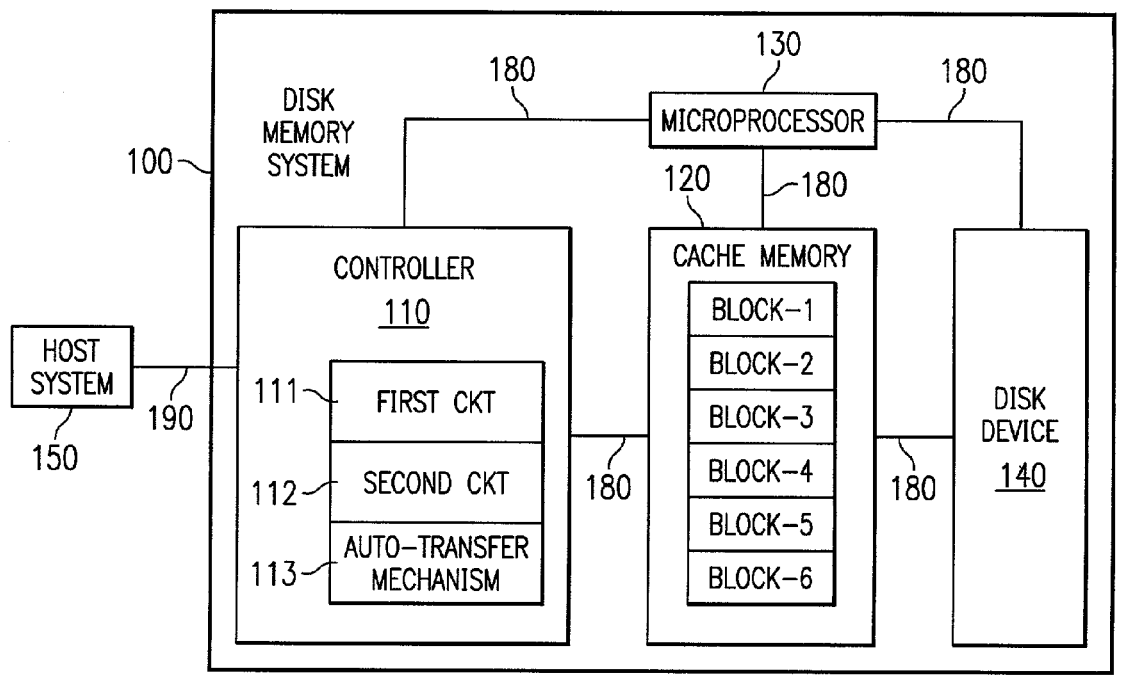
FIG. 1 shows a host system connected to a disk memory system that is constructed and arranged in accordance with a first preferred embodiment of the present invention.

In operation, the preferred embodiments of the present invention operate generally as follows. A host system first issues a Read-Command to the disk-controller. This Read-Command includes (1) a Task-File-Address or TFA parameter that defines the address of the first data-block within the host-data-request, and (2) a Transfer-Length or TL parameter that defines how many data-blocks are requested by the host-data-request.

The disk-controller includes a plurality of registers that, prior to receiving a host-data-request, contain (1) a Buffer-Counter or CTR parameter that defines the total number of data-blocks within the cache memory, (2) a Start-Address or SA parameter that defines the starting address of the first data-block within the cache memory, and (3) a Buffer-Pointer or PTR parameter that points to the first data-block in the cache memory.

When the disk-controller receives a Read-Command from the host system, the disk-controller studies the above parameters and determines if the first data-block in the host-data-request is the same as the starting data-block in the cache memory (i.e., TFA=SA).

When the disk-controller determines that TFA=SA, the disk-controller then determines if all of the host-data-request (i.e. TL) is in the cache memory. If it is, the disk-controller initiates auto-transfer. If it is not, then concurrent auto-transfer and microprocessor-controlled storage device transfer occur.

When the disk-controller determines that TFA does not equal SA, the disk-controller then determines if the data-block identified by TFA can be found anywhere in cache memory. When the data-block TFA is found in cache memory, the disk-controller resets the cache-parameters CTR, SA and PTR to a new-value CTR', to a new-value SA' and to a new-value PTR', these new-values being based upon where in cache memory the data-block TFA was found. The disk-controller then makes a determination of whether or not all of the host-requested-data is in cache memory, and an auto-transfer occurs, or a concurrent auto-transfer and microprocessor-controlled storage device transfer occurs, in accordance with this determination.

In this way, the disk memory system of the invention performs either a whole-auto-transfer, or a partial-auto-transfer, when the first data-block of the host-requested-data is not the first data-block within the cache memory.

The terms defined below are used in calculating the present invention.

Buffer-Counter or CTR within disk-controller 110—A counter that initially contains the total number of blocks of data that are within cache memory 120, which counter is reset to a smaller number of blocks of data within cache memory 120 when the first block of host-requested-data is not the first block of data in cache memory 120. "Blocks" of data is a logical construct, and the blocks can be of any uniform or variable size, whether or not related to a physical feature of the system or the data, as desired for a given application.

Start-Address or SA within disk-controller 110—Initially the address of the first block of data that is within cache memory 120, and reset to the address of a different block of data within cache memory 120 when the first block of host-requested-data in cache memory 120 is not the first block of data in cache memory 120.

Buffer-Pointer or PTR within disk-controller 110—A pointer that initially points to the first block of data within cache memory 120, which pointer is reset to point to a different block of data within cache memory 120 when the first block of host-requested-data is not the first block of data in cache memory 120.

Task-File-Address or TFA within host system 150—The address of the first block of a host-data-request that is received by host interface 210 from host system 150.

Transfer-Length or TL within host system 150—A number that specifies the total number of blocks of data that are within a host-data-request that is received by host interface 210 from host system 150.

FIG. 1 illustrates a disk memory system 100 in accordance with a preferred embodiment of the present invention that includes a disk-controller 110 having a first-circuit 111, a second-circuit 112, and an auto-transfer mechanism 113.

Disk memory system 100 also includes a cache memory 120, one or more storage devices 140 and a microprocessor 130. As shown at 180, all of the above described components of disk memory system 100 are operationally interconnected. While the preferred embodiments are directed to a "disk" based memory system, the present teaching would apply equally to a tape-based or other mass storage type of system.

As will be apparent to those of skill in the art, storage device 140 and cache memory 120 can take a variety of forms. In a preferred embodiment, storage device 140 comprises one or more hard disk drives, and cache memory 120 comprises random access memory (RAM). In other embodiments, storage device 140 could comprise one or more optical storage devices (e.g. CD-ROM, DVD, and the like) and cache memory 120 could comprise, e.g. flash RAM and the like.

Disk memory system 100 is operationally coupled at 190 to a host system 150. Host system 150 could be a computer, such as a personal computer (PC), a mainframe computer, or some other data processing device. Cache memory 120, microprocessor 130, storage device 140, host system 150, and their respective couplings are configured to operate in an overall conventional manner. Host system 150 and disk memory system 100 can be physically separate devices or integrated into a single physical unit.

Controller 110 includes circuitry that operates to initiate the auto-transfer of data from cache memory 120 without requiring the intervention of microprocessor 130 when the first block of data that is requested by host system 150 is available within cache memory 120, including when this first block of data is not the first block of data that is available in cache memory 120.

In typical operation, host system 150 first requests data from controller 110. First-circuit 111 within controller 110 responds to this host-data-request by determining if at least a portion of the host-requested-data is resident within cache memory 120. First-circuit 111 generates an output (see output 505 of FIG. 4) when at least a portion of the host-requested-data is within cache memory 120.

Second-circuit 112 within controller 110 is operationally coupled to first-circuit 111, and second-circuit 112 receives the above described output from first-circuit 111 as an input.

Figure 4:
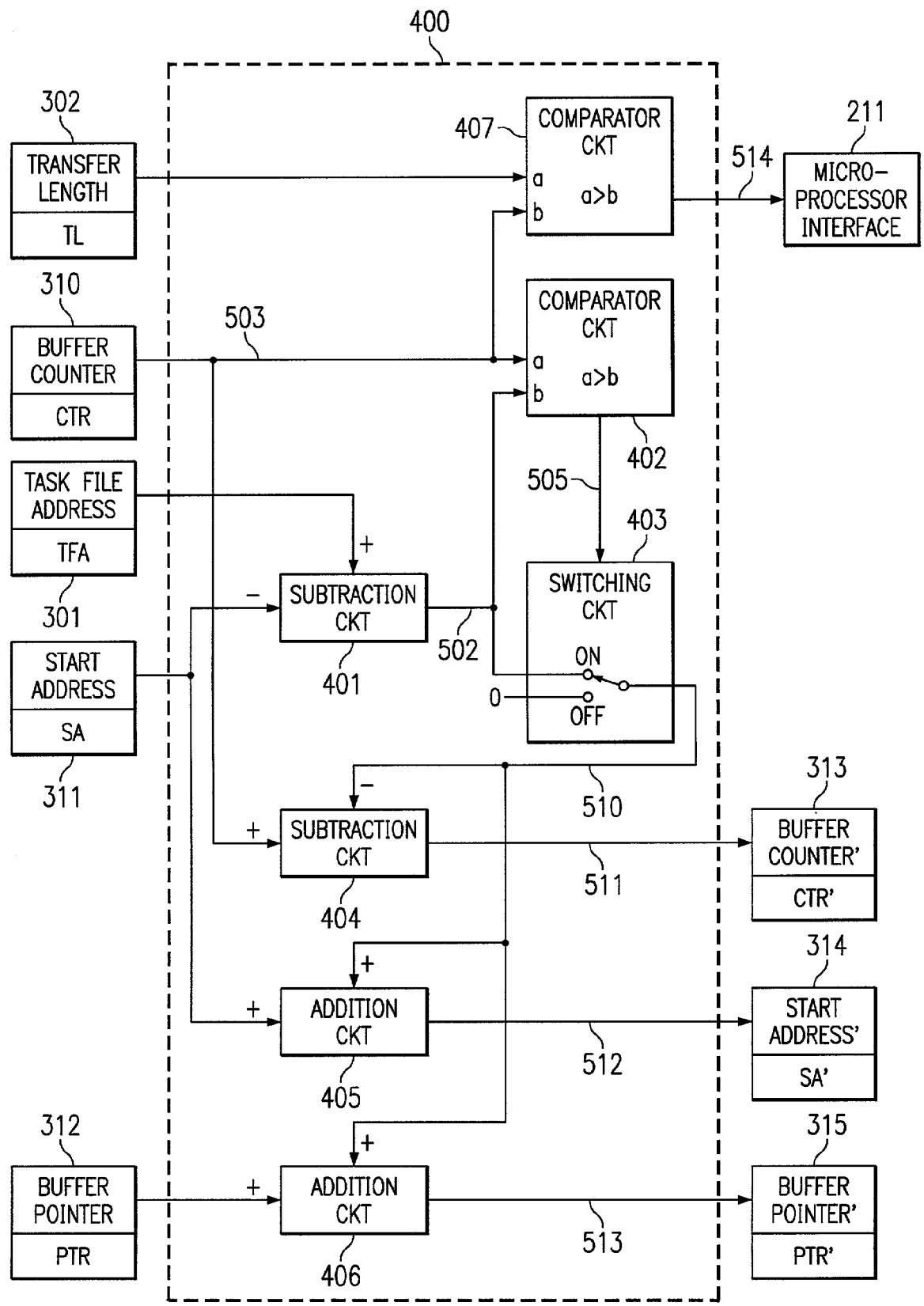
FIG. 4 is a schematic illustration of circuitry that implements an embodiment of the invention, this circuitry comprising a portion of the host interface shown in FIGS. 2 and 3.

When the first block of data within cache memory 120 is not the first block of data within the host-data-request, second-circuit 112 operates (1) to generate a new value for a Buffer-Counter (see 313 of FIG. 4), (2) to generate a new value for a Start-Address (see 314 of FIG. 4), and (3) to generate a new value for a Buffer-Pointer (see 315 of FIG. 4).

Auto-transfer mechanism 113 then initiates the auto-transfer of host-requested-data from cache memory 120 to host system 150, using these three new values, i.e. using a new value CTR' for the Buffer-Counter, using a new value SA' for the Start-Address, and using a new value PTR' for the Buffer-Pointer.

Controller 110 also includes other conventional components, not illustrated, that are known to those skilled in the art, but which are not necessary for understanding the present invention.

When first-circuit 111 detects that the entirety of the host-requested-data is not in cache memory 120 (see 514 of FIG. 4), controller 110 invokes microprocessor 130 (see microprocessor interface 211 of FIGS. 2 and 3) to transfer the missing data from storage device 140 to cache memory 120 and then to host system 150, concurrently with the other host-requested-data being auto-transferred to host system 150 from cache memory 120 by operation of auto-transfer mechanism 113.

It should be noted that controller 110 performs the above-described auto-transfer of data even when the first block of data that is requested by host system 150 is not the first block of data that is available within cache memory 120. Importantly, controller 110 performs this auto-transfer without the intervention of microprocessor 130. Microprocessor 130 is therefor free to retrieve other data from storage device 140, as needed.

When first-circuit 111 does not detect at least a portion of the host-requested-data in cache memory 120, microprocessor 130 operates to retrieve the host-requested-data from storage device 140.

Figure 2:
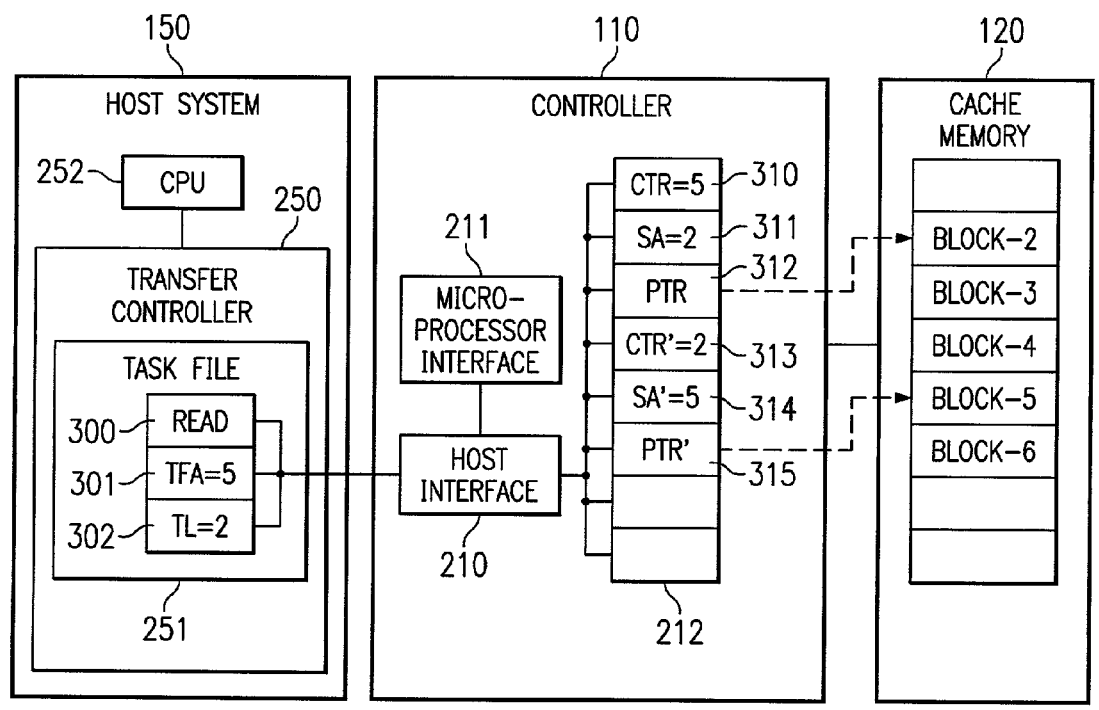
FIG. 2 illustrates in block diagrams form functional units of the system shown in FIG. 1.

FIG. 2 is useful in describing a mode of operation of FIG. 1 wherein host system 150 requests data from disk memory system 100, and the auto-transfer of all of the host-requested-data from cache memory 120 does not require intervention by microprocessor 130. That is, FIG. 2 provides an example of a situation in which the first block of data that is within the host-data-request (i.e. block-5) is not the first block of data that is within cache memory 120 (i.e. block-2), wherein the host-data-request comprises block-5 and block-6, and wherein both block-5 and block-6 reside in cache memory 120. In this example, CTR=5 is resent to CRR'=2, SA=2 is reset to SA'=5, and PTR=block-2 is reset to PTR'=block-5.

As shown in FIG. 2, controller 110 includes a host interface 210 that is coupled to a plurality of registers 212 and to microprocessor 130 by way of a microprocessor interface 211.

Host system 150 includes a transfer controller 250 having a task file 251 and that is coupled to a CPU 252. When CPU 252 requires data, CPU 252 instructs transfer controller 250 to request the data from host interface 210. In doing so, transfer controller 250 loads into transfer file 251 (1) a Read-Command 300, (2) a Task-File-Address or TFA 301, and (3) a Transfer-Length or TL 302. The specifics of the manner in which the data 300, 301, 302 that is now within task file 251 is used by transfer controller 250 and by host interface 210 are well known in the art.

In the example of FIG. 2, the Task-File-Address or TFA 301 equals the value 5, this being the address of block-5 within cache memory 120, and the Transfer-Length or LT 302 equals the value 2, this indicating that the block-length of the data that is requested by CPU 252 comprises two blocks of data, i.e. block-5 and block-6.

Host interface 210 now detects Read-Command 300. As a result of detecting Read-Command 300, host interface 210 operates to retrieve "TFA=5" and "TL=2" in preparation for the transfer of the host-requested-data from disk memory system 100 to host system 150.

Host interface 210 also retrieves the content of Buffer-Counter 310 (i.e. CTR=5), Start-Address 311 (i.e. SA=2), and Buffer-Pointer 312 (i.e. PTR=block-2) from registers 212.

In the FIG. 2 example, "CTR=5" indicates that five blocks of data are within cache memory 120, "SA=2" indicates that the first block of data within cache memory 120 is block-2, and "PTR=2" points to block-2 within cache memory 120. Note that cache data block-2 is not the first data block of the host-data-request, this being block-5.

In the example of FIG. 2, host system 150 has requested block-5 and block-6 from cache memory 120 by way of TFA=5 and TL=2. However, both SA 311 and the PTR 312 identify block-2 as the first block of data within cache memory 120. In prior systems, this condition would cause controller 110 to invoke microprocessor 130 to initiate the transfer of data from magnetic disk system 140 to host system 150 since the first block of requested data (i.e. block-5) is not the first block of data within cache memory 120.

In the preferred embodiments of the present invention, however, host interface 210 detects the location of the first block of the host-requested-data within cache memory 120, and then operates to generate new values CTR' 313, SA' 314, and PTR' 315 to replace the original values CTR 310, SA 311, and PTR 312. In FIG. 2 these new values 313-315 are depicted in separate registers 212 from the original values 310-312, but if desired, the new values 313-315 can be written over the original values 310-312 to save register hardware.

The following formula are used to generate the new values 313-315:

$$CTR'313 = CTR310 - (TFA301 - SA311)$$

$$SA'314 = SA311 + (TFA301 - SA311)$$

$$PTR'315 = PTR312 + (TFA301 - SA311)$$

In this example:
- CTR'=5−(5−2), i.e. CTR'=2, indicating that two blocks of data corresponding to the host-data-request are resident within cache memory 120.
- SA'=2+(5−2), i.e. SA'=5, indicating that the cache start address of the first block of data that corresponds to the first block of data in the host-data-request is the address of block-5 in cache memory 120.
- PTR'=2+(5−2), i.e. PTR'=5, thus providing a pointer to block-5 in cache memory 120.

Auto-transfer is now initiated by auto transfer mechanism 113, FIG. 1, preferably, without the intervention of microprocessor 130. Auto-transfer mechanism 113 uses these new values of CTR'=2, SA'=5, and PTR'=5, with cache block-5 now being defined as the first block of available-data within cache memory 120.

Figure 3:
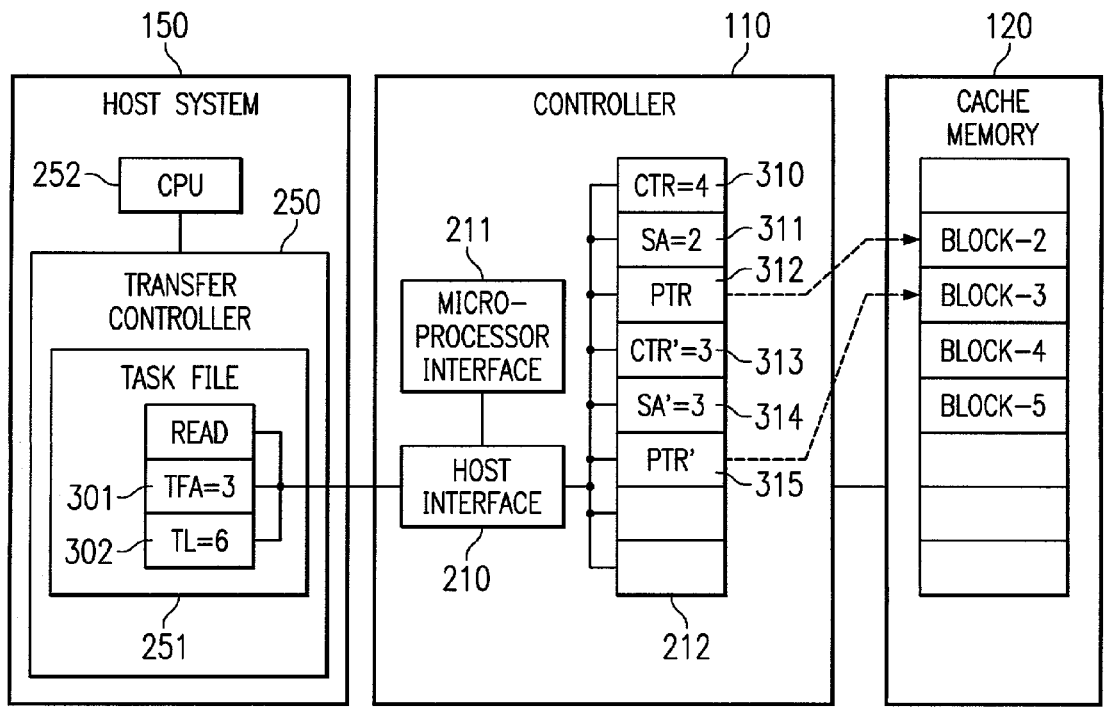
FIG. 3 illustrates an alternative example of a system for auto-transfer of data from the cache memory of FIG. 1.

FIG. 3 is useful in describing another example of the auto-transfer of data from cache memory 120 in accordance with this invention, this example being a situation wherein cache memory 120 only contains a portion of the host-requested-data.

FIG. 3 depicts an example of an auto-transfer using the same elements above described relative to FIG. 2, but in the FIG. 3 example (1) TFA=3, thus indicating that the first block of the host-requested-data is block-3, (2) TL=6, thus indicating that the host-requested-data is 6 blocks long, or block-3-through-block-8, (3) CTR=4, thus indicating that 4 blocks of data reside in cache memory 120, (4) SA=2, thus indicating that the first block of data in cache memory 120 is block-2, and PTR=2, thus pointing to block-2 within cache memory 120.

In the example illustrated in FIG. 3, cache memory 120 contains four blocks of data, i.e. block-2 through block-5. The host-requested-data, however, starts at block-3 and includes a total of six blocks of data, i.e. the host-requested-data comprises block-3-through-block-8. Thus, cache memory 120 contains only the portion block-3-through-block-5 of the host-requested-data.

Host interface 210 detects this condition and signals microprocessor interface 211 to request that microprocessor 130 initiate a transfer of the remaining or missing data (i.e. block-6 through block-8) from storage device 140.

Host interface 210 also generates the new values CTR', SA', and PTR', as above described, to replace the original values of CTR=4, SA=2, and PTR=2.

In the example of FIG. 3:
  CTR'=4−(3−2), i.e. CTR=3, indicating that three blocks of data corresponding to the host-data-request are resident within cache memory 120.
  SA'=2+(3−2), i.e. SA'=3, indicating that the cache Start-Address of the first block of data that corresponds to the first block of data in the host-data-request is the address of block-3 within cache memory 120.
  PTR'=2+(3−2), i.e. PTR'=3, thus providing a pointer to block-3 within cache memory 120.

Thus, concurrently with microprocessor 130 transferring missing data blocks block-6-through-block-8 from storage device 140, auto-transfer mechanism 113 auto-transfers block-3 through block-5 from cache memory 120, using the new values CTR'=3, SA'=3, and PTR'=block-2.

Advantageously, this auto-transfer is accomplished without intervention by microprocessor 130. Thus, microprocessor 130 is free to initiate a transfer of the remaining or missing block-6-through-block-8 from storage device 140 at the same time as auto-transfer occurs. This simultaneous data transfer significantly lowers the overall time that is required to perform a data transfer in response to the host-data-request.

FIG. 4 depicts circuitry 400 that implements an embodiment of the invention, however, the spirit and scope of the invention is not to be restricted to this particular circuit/logic implementation. Preferably, but not by way of limitation, circuitry 400 is implemented on an integrated circuit that comprises host interface 210 of disk-controller 110.

Circuitry 400 includes a first subtraction-circuit 401 that receives Task-File-Address or TFA 301 and Start-Address or SA 311. Subtraction-circuit 401 performs the above-described TFA−SA operation, and operates to generate a first-output 502 that equals Task-File-Address 301 minus Start-Address 311. Stated another way, first-output 502 is a number that equals the quantity (the number of the first block within the host-data-request)−(the number of the first data block within cache memory 120).

A first comparator-circuit 402 is operationally coupled to subtraction-circuit 401 to thereby receive first-output 502 or the quantity TFA−SA. Comparator-circuit 402 also receives an output 503 from Buffer-Counter or CTR 310, this initial value of CTR being the total number of data blocks within cache memory 120.

Comparator-circuit 402 generates a second-output 505 only when the value of CTR 310 is greater than the quantity TFA−SA. The presence of second-output 505 is defined by the on-state of second-output 505, whereas the absence of second-output 505 is defined as the off-state of second-output 505. As will be apparent, the on-state of second-output 505 causes a third-output 510 to be equal to first-output 502 (i.e. to the value TFA−SA), whereas the off-state of second-output 505 causes third-output 510 to be preferably equal to zero or a logical low value.

A switching-circuit 403 is operationally coupled to be controlled by the presence or absence of second-output 505. When second-output 505 is present, and thus in its on-state, switching-circuit 403 provides a third-output 510 that is equal to first-output 502 (i.e. equal to the value TFA−SA). When second-output 505 is absent, and thus in its off-state, switching-circuit 403 provides a third-output 510 that is preferably equal to zero or a logical low value.

A second subtraction-circuit 404 is operationally coupled to switching circuit 403 to receive third-output 510 as a first input. Subtraction-circuit 404 also receives the output 503 of the Buffer-Counter 310, i.e. the initial value of CTR, as a second input. Subtraction-circuit 404 operates to generate a fourth-output 511 equal to the initial value of CTR minus the value of third-output 510.

When second-output 505 is present (i.e. the on-state), third-output 510 is equal to first-output 502 (i.e. TFA−SA), and fourth-output 511 equals the quantity CTR−(TFA−SA), this being the above-described new value for CTR 310, i.e. CTR' 313.

When second-output 505 is absent (i.e. the off-state), third-output 510 is equal to zero, and fourth-output 511 equals the quantity CTR 310, i.e. the initial value of CTR is not reset.

A first addition-circuit 405 is also operationally coupled to switching-circuit 403 to receive third-output 510 as a first input. Addition-circuit 405 also receives the initial Start-Address or SA 311 as a second input. Addition-circuit 405 operates to generate a fifth-output 512 that equals third-output 510 added to SA 311.

When second-output 505 is present (i.e. on the on-state), third output 510 is equal to first output 502 (i.e. TFA−SA), and fifth-output 512 equals the quantity SA−(TFA−SA), this being the above-described new value for SA 311, i.e. SA' 314.

When second-output 505 is absent (i.e. the off-state), third-output 510 is equal to zero, and fifth-output 512 equals the quantity SA 311, i.e. the initial value of SA is not reset.

A second addition-circuit 406 is also operationally coupled to switching-circuit 403 to receive third-output 510 as a first input. Addition circuit 406 also receives the initial value of Buffer-Pointer 312 (i.e. PTR 312) as a second input. Addition-circuit 406 operates to generate a sixth-output 513 that equals the third-output 510 added to PTR 312.

When second-output 505 is present (i.e. the on-state), third-output 510 is equal to first-output 502 (i.e. TFA−SA), and sixth-output 513 equals the quantity TR+(TFA−SA), this being the above-described new value for PTR 312, i.e. PTR' 315.

When second-output 505 is absent (i.e. the off-state), third-output 510 is equal to zero, and sixth-output 513 equals the quantity PTR 312, i.e. the initial value of PTR is not reset.

When second-output 505 is present, these calculated new values of CTR' 313, SA' 314 and PTR' 315 are used by controller 110 to initiate the auto-transfer of host-requested-data.

A second comparator-circuit 407 receives the Transfer-Length or TL 302 as a first input, and receives the initial value of Buffer-Counter or CTR 310 as a second input. Comparator-circuit 407 generates a seventh-output 514 only when the Transfer-Length is greater than the Buffer-Counter, i.e. when TL 302 is greater than CTR 310. In response to the presence of seventh-output 514, microprocessor interface 211 invokes microprocessor 130 to transfer the host-requested-data that is not within cache memory 120 from storage device 140 to host system 150.

Seventh-output 514 allows microprocessor 130 to initiate a transfer of the missing host-requested-data from storage device 140 at the same time as the auto-transfer of host-requested-data occurs from cache memory 120. This simultaneous data transfer significantly lowers the overall time that is required to perform the requested data transfer to host system 150.

FIGS. 5 through 9 show examples of a number of different relationships between the data-content of cache memory 120 and data that is requested by host system 150. In all of these examples it is assumed that cache memory 120 contains twenty data blocks, identified as data-1-through-data-20. As a result, the initial value of CTR=20, the initial value of SA=1, and the initial value of PTR=1 for all of the examples. In addition, the host-requested-data in all of the examples is assumed to be for data that is five data-blocks long, thus TL=5 for all of the examples. All examples vary in that the Task-File-Address or TFA is different for each example. Obviously, the size and configuration of the cache and data requests will vary tremendously in actual applications.

Figure 5:
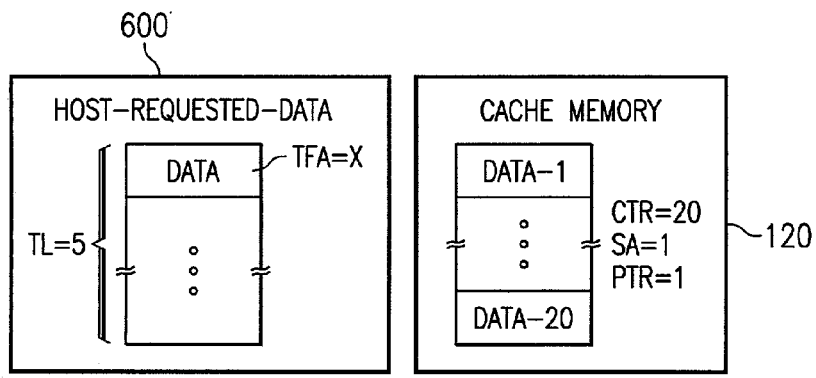
FIGS. 5 through 9 show example relationships between the data-content of the disk memory system's cache memory and the data that is requested by the exemplary host system of FIG. 1.
Figure 6:
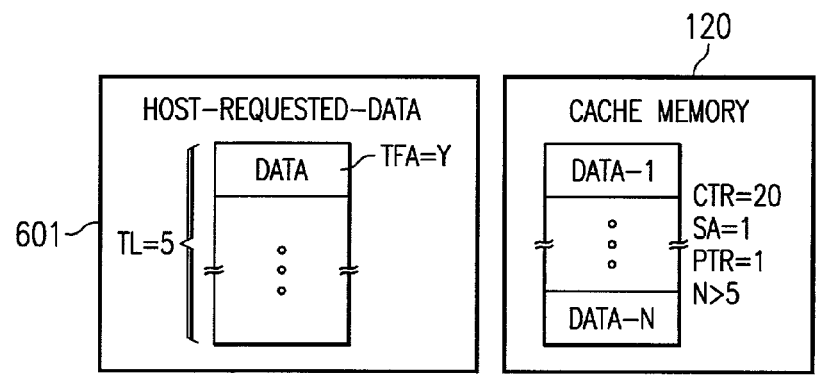

In FIGS. 5 and 6 the relationship between the data within cache memory 120 and the respective host-requested-data 600 or 601 (FIGS. 5 and 6, respectively) is such that none of the host-requested-data 600 or 601 is within cache memory 120 when a Read-Command 300 is received by controller 110 from host system 150. As a result, controller 110 operates to invoke microprocessor 130 to fetch or obtain the respective host-requested-data 600 or 601 from storage device 140. This fetched-data is then both stored in cache memory 120 and supplied to host system 150. In FIG. 5, cache 120 is twenty blocks long, whereas in FIG. 6, cache 120 is N blocks long, with N being greater than five.

Figure 7:
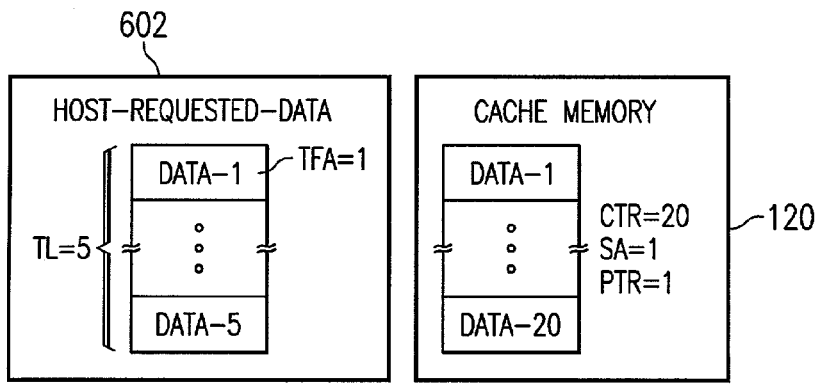

In FIG. 7, not only is all of host-requested-data 602 within cache memory 120 when Read-Command 300 is received by controller 110, but in addition, the first data-block within host-requested-data 602 comprises the first data-block within cache memory 120. In this case, using the parameters TFA=1, TL=5, CTR=20, SA=1 and PTR=1, the auto-transfer of data-1 through data-5 from cache memory 120 occurs, as above described, without invoking the assistance of microprocessor 130.

Figure 8:
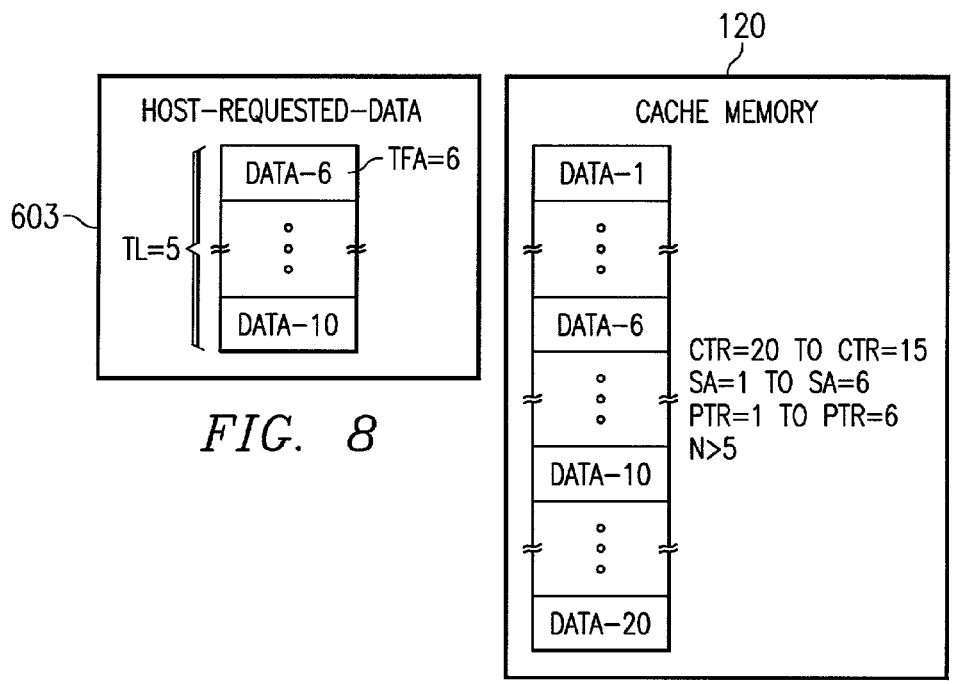

In FIG. 8, all of the host-requested-data 603 is again within cache memory 120 when Read-Command 300 is received by controller 110. However, in this example, the first data-block within host-requested-data 603 comprises data=6, and data-6 is not the first data block within cache memory 120. In this case, the values of CTR, SA, and PTR are recalculated as above described. Following this recalculation, and using the parameters TFA=6, TL=5, CTR'=15, SA'=6 and PTR'=6, the auto-transfer of data 6 through data 10 occurs as above described, again without invoking the assistance or microprocessor 130.

Figure 9:
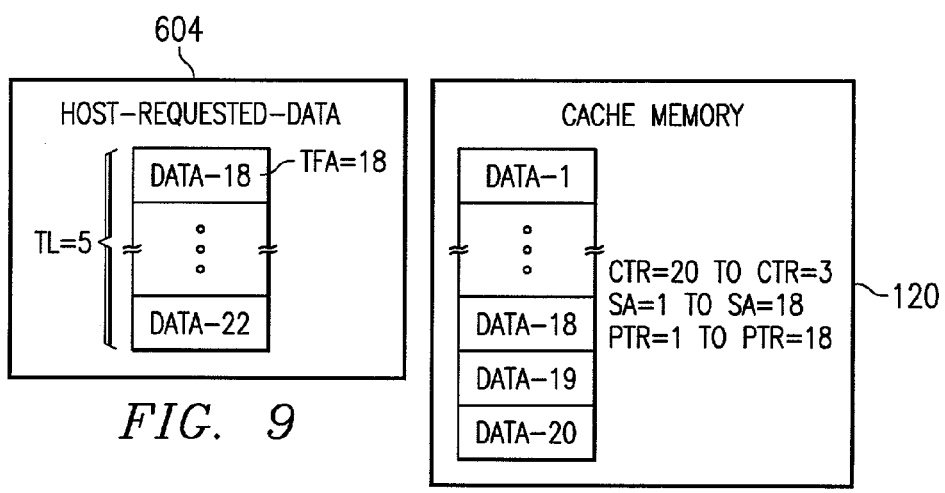

FIG. 9 provides an example wherein a first-portion of host-requested-data 604 resides within cache memory 120, but a second-portion of host-requested-data 604 does not reside in cache memory 120. In this example, the first data-block within host-requested-data 604 comprises data-18. Again, data-18 is not the first data-block within cache memory 120. In this case, the values of CTR, SA, and PTR are recalculated as above described. Following this recalculation, and using the parameters TFA=18, TL=5, CTR'=3, SA'=18, the auto-transfer of data-18 through data 20 occurs as above described.

However, in this example, controller 110 operates to concurrently invoke the assistance of microprocessor 130 to fetch data-21 and data-22 from storage device 140. This operation by controller 110 is transparent to host system 150, since host system 150 receives the requested data-18 through data-22 by virtue of the concurrent auto-transfer-operation and microprocessor-fetch-operation.

FIG. 10 is a process or method flow chart that shows the operation of the presently preferred embodiments of the present invention. At step-700 of this flow chart controller 110 awaits the arrival of a Read-Command 300 and its parameters TFA and TL from host system 150.

When such a Read-Command 300, containing the above described TFA and TL parameters, is detected at step-701, controller 110 compares the TFA parameter and the TL parameter supplied by the Read-Command to the cache memory's initial CTR, SA and PTR parameters that are contained within registers 212 of controller 110.

From this comparison, and at decision-step-702, controller 110 determines whether or not the TFA parameter that is supplied by the Read-Command is equal to the SA parameter that is obtained from cache memory 120, i.e. does the first data-block of the host-data-request equal the first data-block in cache memory 120?.

The "Yes" output 703 of decision-step-702 enables decision-step-704 whereat controller 110 determines whether or not cache memory 120 contains enough data-blocks to satisfy the TL parameter that is supplied by the Read-Command.

The "Yes" output 720 of decision-step-704 enables step-705, and in response thereto, controller 110 initiates the auto-transfer of the host-requested-data from cache memory 120, whereupon the FIG. 10 process ends at step-706.

The "No" output 715 of decision-step-704 indicates that the number of blocks in cache 120 is less than the number of requested blocks, TL, meaning that only a portion of the requested data resides in cache memory 120. Controller 110 now operates to concurrently enable step-716 and step-717. At step-716 controller 110 initiates the auto-transfer of the portion of requested data that is within cache memory 120, and at step-717 controller 110 invokes the power of microprocessor 130 to obtain the remaining or cache-missing portion of requested data from magnetic disk drive 140. The FIG. 10 process then ends at step-718.

Assuming that the "No" output 707 of decision-step-702 has been enabled, i.e. assuming that the first data-block in the Read-Command (i.e. as defined by TFA) did not equal the first data-block in cache memory 120 (i.e. as defined by the initial value of SA), then decision-step-708 is enabled, whereupon controller 110 determines if TFA is anywhere in cache memory 120.

The "No" output 709 of decision-step-708 enables step-710, whereupon microprocessor 130 operates to fetch the FTA/TL host-data-request from storage device 140. The FIG. 10 process then ends at step-711.

The "Yes" output 712 of decision-step-708 enables step-713, whereupon controller 110 operates to reset or recalculate the three cache-parameters CTR, SA and PTR that related to cache memory 120 (i.e. CTR', SA' and PTR'). Output 714 of step-713 now reenters the FIG. 10 process at above-described decision-step-704, whereupon decision-step-704 repeats, and the process ends at step-706 or step-718, as above-described.

From the above detailed description it can be seen that the present invention provides a disk memory system 100 that stores data in both slow disk storage 140 and on-board fast cache 120.

When host system 150 requests data from disk memory system 100, system 100 first looks for a least a portion of the request-data within cache 120. Only when no request-data, or less than all of the request-data, is found within cache 120 does system 100 attempt to retrieve request-data from disk storage 140. This process is called cache-hit detection, or more specifically partial-hit-detection.

When a whole-cache-hit situation is detected, -auto-transfer of all of the request-data occurs from relatively fast cache 120.

When a partial-cache-hit situation is detected, auto-transfer of the cache-hit-data-portion occurs from relatively fast cache 120, without the intervention of microprocessor 130. Since microprocessor 130 is now "free", its power is concurrently used to transfer the cache-miss-data-portion from relatively slow disk storage 140.

Since the present invention operates to perform auto-transfer without microprocessor intervention when any of the request-data is in cache 120, and not simply when the first data-block of the request-data is the first data-block within cache 120, microprocessor 130 is more often left free to do other work within disk memory system 100.

This invention provides an apparatus and a method that initiates the auto-transfer of host-requested-data from a cache memory that is on-board a disk memory system. Auto-transfers occur even when the first block of host-requested-data is not the first block of available-data in the cache memory. Auto-transfers are performed without the intervention of a microprocessor that is also on-board of the disk memory system when at least some of the host-requested-data is present in the cache memory, and in this partial-cache-hit situation, the power of the microprocessor is invoked to retrieve the cache-missing data from the storage device simultaneous with the auto-transfer of the other data from cache memory. As a result of the operation of this invention, host-requested-data is rapidly transferred to the host, and microprocessor performance is improved.

As those skilled in the art will appreciate, variations of the above-described embodiments of the present invention will fall within the spirit and scope of the invention. For instance, many of the components of the preferred embodiments, such as the circuits illustrated in FIG. 4, are illustrated as hardwired logic circuits. One skilled in the art will recognize that the circuits could also be implemented as discrete or integrated circuits, or as a special or general purpose processor executing programmed instructions such as software or firmware, or some combination of the above. Additionally, although separate registers are illustrated, the various registers described herein could be realized as portions of RAM memory, including cache memory 120, reserved for such purpose. In yet other embodiments, the registers could be realized as data stored on portions of the mass storage device itself, or stored in memory or registers of the host system 150. Variations of the data request from host 150 are also within the contemplated scope of the present invention, as well as variations in the content and configuration of cache memory 120. Variations in the above described formulae for calculating CTR', SA', and PTR' will be apparent to one skilled in the art with the benefit of routine experimentation and are within the scope of the present invention as well. One skilled in the art will also recognize that the data block addresses discussed above may be embodied as logical addresses and that the logical block addresses of the host system 150 (e.g., TFA) will not necessarily correspond to the logical block address of the cache memory 120 (e.g., SA) and that a logical translation of the host system addresses and the cache memory addresses may be required prior to the above described operations. As a result, the invention is not limited to the specific embodiments discussed above, but only by the following claims and their equivalents.

What is claimed is:

1. A mass storage system comprising:
   a mass storage device;
   a cache memory coupled to the mass storage device, the cache memory being organized in data blocks and having a first data block;
   a microprocessor coupled to the mass storage device and the cache memory; and
   a controller coupled to the microprocessor and the cache memory, wherein the controller:
      receives a data request from a host system;
      calculates new cache counter and pointer values when a first requested data block is not contained within the first block of the cache;
      initiates an auto-transfer of the requested data that resides in the cache to the host system; and
      requests a transfer of the requested data that resides in the mass storage device directly to the host system, wherein the request of the transfer and the initiation of the auto-transfer occurs substantially concurrently.

2. The mass storage system of claim 1 further comprising a controller register including:
   a counter register containing a value for the number of blocks of data in the cache memory,
   a start address register identifying the first block of data in the cache memory; and
   a pointer register containing a pointer to the first block of data in the cache memory.

3. The mass storage system of claim 1 wherein the microprocessor transfers the requested data that resides in the mass storage device to the host system by way of the cache memory.

4. The mass storage system of claim 1 wherein the microprocessor controls the transfer of requested data that resides in the mass storage device and the controller controls the transfer of requested data that resides in the cache.

5. The mass storage system of claim 1 wherein the controller includes a general or special purpose processor executing program instructions.

6. The mass storage system of claim 1 wherein the transfer of requested data that resides in the mass storage device occurs substantially simultaneously with the transfer of data that resides in the cache.

7. The mass storage system of claim 1 wherein the mass storage system and the host system are integrated into a single unit.

8. A method of retrieving data from a mass storage system comprising:
   receiving a data request from a host system, the data request including a block address for a first block of the requested data and a number of blocks in the request;
   if none of the requested data is in a cache memory, initiating a transfer of the requested data from a mass storage device;
   if a portion of the requested data is in the cache memory and a portion of the requested data is in the mass storage device, transferring the portion of the requested data from the cache memory to the host system substantially concurrently with transferring the portion of the requested data from the mass storage device directly to the host system;
   if all the requested data is in the cache memory, transferring the requested data from the cache memory to the host system;

wherein the steps of transferring the requested data from the cache memory system include calculating a staffing location in the cache memory for the transfer, based upon the block address and the number of blocks in the request received from the host system.

9. The method of claim 8 wherein the data request has a first logical address protocol and the cache memory has a second logical address protocol and including the step of translating between the first and second address protocols.

10. A disk memory system, comprising:
a disk-device for storing data-blocks on disk-storage-media;
a cache for storing data-blocks;
a disk-controller;
registers within said disk-controller containing a cache-start-address of a first data-block in said cache, and a cache-block-length that defines a total number of data-blocks stored in said cache;
said disk-controller receiving a data-request that contains a request-start-address of a first data-block in said data-request, and a request-block-length that defines a total number of data-blocks in said data-request;
a microprocessor operationally interconnecting said disk-device, said cache, and said disk-controller;
logic means in said disk-controller responsive to said cache-start-address as compared to said request-start-address, and to said cache-block-length-as compared to said request-block-length;
said logic means being operable to determine when no data-blocks corresponding to said data-request reside in said cache, and operating in response to such a determination to cause said microprocessor to fetch said data-blocks corresponding to said data-request from said disk-device;
said logic means being operable to determine when all of the data-blocks corresponding to said data-request reside in said cache, and operating in response to such a determination to cause said disk-controller to auto-transfer all of said data-blocks corresponding to said data-request from said cache without requiring operation of said microprocessor; and
said logic means being operable to determine when a cache-hit-portion of data-blocks corresponding to said data-request reside in said cache and a cache-miss-portion of said data-blocks corresponding to said data-request do not reside in said cache, and operating in response to such a determination to concurrently cause said disk-controller to auto-transfer said cache-hit-portion of said data-blocks corresponding to said data-request from said cache, and to cause said microprocessor to fetch data-blocks corresponding to said cache-miss-portion of said data-request directly from said disk-device.

11. A disk memory system, comprising:
a relatively slow disk-device for storing data-blocks on disk-storage-media;
a relatively fast cache for storing data-blocks;
a disk-controller, and a microprocessor;
registers within said disk-controller containing a cache-start-address of a first data-block in said cache, and a cache-block-length that defines a total number of data-blocks stored in said cache;
said disk-controller receiving as input a data-request from said host-system;
said data request containing a request-start-address of a first data-block in said data-request, and a request-block-length that defines a total number of data-blocks in said data-request;
a logic circuit in said disk-controller responsive to said cache-staff address as compared to said request-staff-address, and to said cache-block-length as compared to said request-block-length; said logic circuit being operable to determine a cache-miss when no data-blocks corresponding to said data-request reside in said cache, and operating in response to a cache-miss to cause said microprocessor to fetch said data-blocks corresponding to said data-request from said disk-device;
said logic circuit being operable to determine a total-cache-hit when all of the data-blocks corresponding to said data-request reside in said cache, and operating in response to a total-cache-hit to cause said disk-controller to auto-transfer all of said data-blocks corresponding to said data-request from said cache without requiring operation of said microprocessor; and
said logic circuit being operable to determine a partial-cache-hit when a first-portion of data-blocks corresponding to said data-request reside in said cache and a second-portion of said data-blocks corresponding to said data-request do not reside in said cache, and operating in response to a partial-cache-hit to concurrently cause said disk-controller to auto-transfer said first-portion of said data-blocks corresponding to said data-request from said cache, and to cause said microprocessor to fetch data-blocks corresponding to said second-portion of said data-request directly from said disk-device.

12. The disk memory system of claim 11 wherein the slow disk-device, the fast cache, the disk controller, and the microprocessor all of which are operationally and electrically interconnected to form a unitary disk memory system that appears as a single source of data-blocks to a host-system.

13. The disk memory stem of claim 11 wherein the logic means include a processor executing programmed instructions.

* * * * *